W. BURDON.
Improvement in Water-Elevators.
No. 129,649. Patented July 23, 1872.
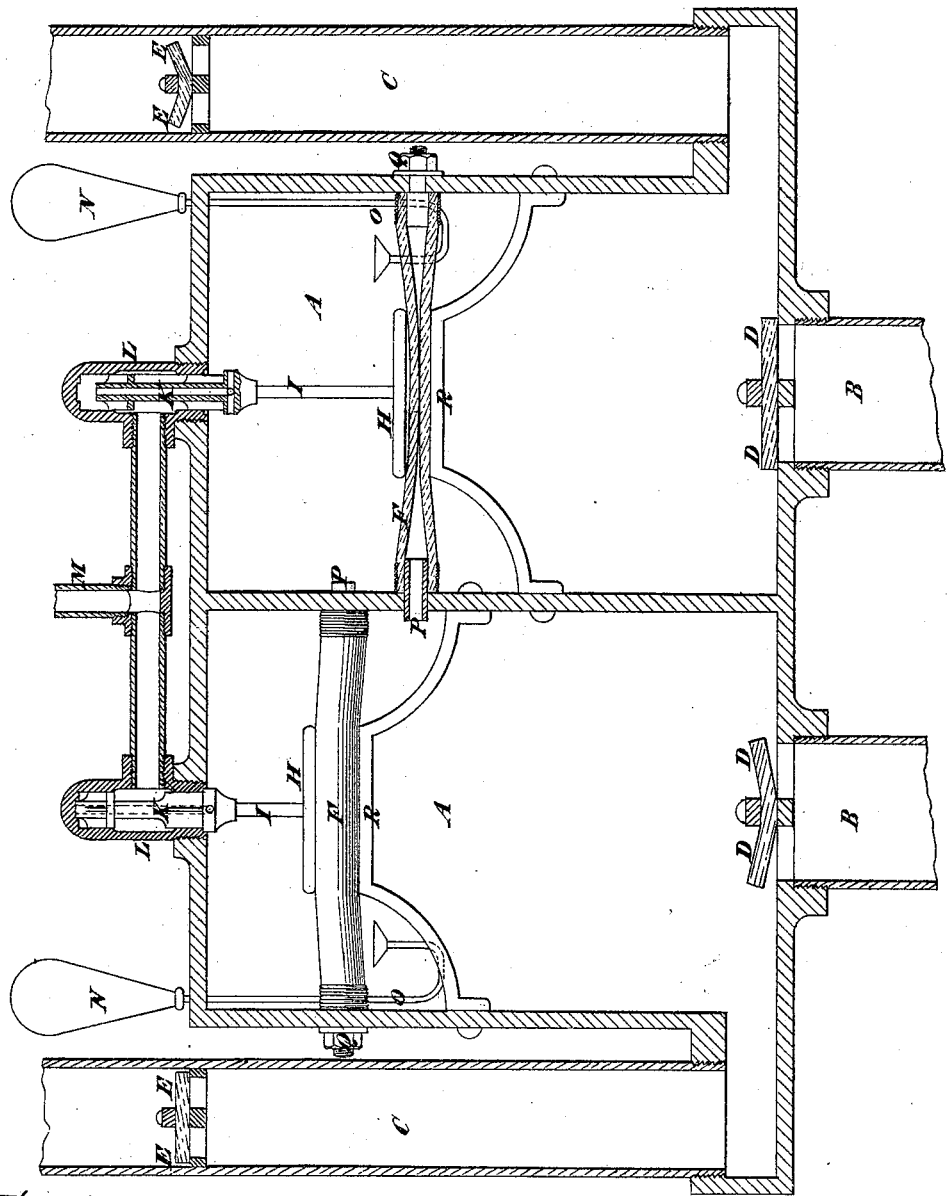

UNITED STATES PATENT OFFICE.

WILLIAM BURDON, OF BROOKLYN, NEW YORK.

IMPROVEMENT IN WATER-ELEVATORS.

Specification forming part of Letters Patent No. 129,649, dated July 23, 1872; antedated July 17, 1872.

*To all whom it may concern:*

Be it known that I, WILLIAM BURDON, of the city of Brooklyn, in the county of Kings and State of New York, have invented a new and useful Improvement in Apparatus for Raising and Forcing Water by the Condensation and Pressure of Steam; and I hereby declare that the following is a full, clear, and exact description of the same, reference being had to the accompanying drawing forming part of this specification.

This invention relates to that kind of apparatus for raising and forcing water in which a vacuum is formed by the condensation of steam, and the water which is raised by atmospheric pressure into the vacuum so formed is afterward expelled from the apparatus by the pressure of steam, the condensation of which is again made to form a vacuum for the repetition of the operation. The improvement consists in novel means, in connection with two chambers, for effecting the above-named operation, whereby the production of the vacuum in either chamber is made the means of opening the steam-valves for admitting steam to the other chamber, and the introduction of steam into either chamber is made the means of producing the closing of the steam-valve for shutting off the steam from the other, and a regular alternating operation of the two chambers is produced, the two chambers and appurtenances thereby constituting a very simple and effective double-acting apparatus.

The accompanying drawing represents a vertical section of an apparatus with my improvement.

A A are the two water-chambers, which may be arranged side by side, as represented, or in other convenient relation to each other, and may be of any convenient form. Each has connected with its bottom a suction-pipe, B, fitted with valves D D which open inward, and each is furnished with a discharge-pipe, C, which communicates with it a short distance from its bottom, the discharge-pipes being fitted at some distance above their communication with the chambers, with valves E E, which open outward. At the top of each chamber A there is a valve-box, L, containing a valve to admit of steam to the chamber from a steam-pipe, M, which connects with a boiler, and from which two branches communicate with the said valve-box. The valves K K may be of any known or suitable construction that will open by a downward and close by an upward motion, but should, preferably, be of nearly-balanced construction. Each of these valves has connected with its stem I, which projects downward into its respective chamber, a disk or foot, H, which rests upon a flexible diaphragm, F, which is stretched across its respective chamber, and which is supported upon a bridge, R, extended across the chamber. The flexible diaphragms F F may be variously made of hollow construction, so as to be capable of receiving steam within them; but I propose generally to make them, and have represented them made, each of a piece of stout and moderately-stiff India-rubber tubing, one end of which is closed tightly by a plug or stud, Q, which connects it securely with the outer side of its respective chamber A, and the other end of which is connected with a nozzle, P, which forms a communication between its interior and the other chamber—that is to say, the diaphragm, which is arranged within the right-hand chamber, has its interior in communication with the left-hand chamber, and the diaphragm which is arranged within the left-hand chamber has its interior in communication with the right-hand chamber. In each chamber A there is represented a pipe, O, of inverted siphon-shape, terminating in a rose or sprinkler, and communicating outside of the chamber with an air-chamber, N.

The operation of this apparatus is as follows: To prepare for starting it, the vessels A must first be filled with water. This may be done by pouring in water through openings provided for the purpose, and which are afterward closed. The apparatus is then started by admitting steam, through one of the branches of the pipe M and valves K, into one of the chambers—I will suppose, for example, the right hand chamber. The diaphragm F in that chamber is then collapsed, as shown in the drawing, by the pressure of steam, while the diaphragm in the left-hand chamber is distended by the steam entering it through its nozzle P, and the valve K of the latter chamber is kept closed by the upward pressure of the diaphragm. The steam presses out the water from the right-hand chamber until its level gets down to the bottom of the discharge-pipe C, when the water, descending from the said pipe, condenses the steam and produces a vacuum in the said chamber and in the diaphragm F of the left-hand chamber. The left-hand diaphragm then collapses and allows its respective valve K to open and admit steam to the left-hand chamber, which then discharges its water through its pipe C, while the steam is shut off from the right-hand chamber by the closing of its valve K, produced by the distension of its diaphragm by the pressure admitted into it from the left chamber. The right-hand chamber in the meantime fills again with water. When the left-hand chamber has been discharged down to the level of the bottom of its discharge-pipe C, condensation and the formation of a vacuum commence therein, and its diaphragm F becomes distended, and is thereby made to close its valve K, while the diaphragm of the right-hand chamber collapses and allows the valve K of that chamber to open and admit steam thereinto. In this way the chambers are alternately filled and discharged, either one filling while the other is discharging, the operation of opening and closing of the steam-valve of each chamber being produced by the collapsion and distension of the diaphragm in the other chamber. During the discharge of the water from either chamber a portion of it is forced up into the pipe O and the air in said pipe, and its air-vessel N, and as soon as the discharge has been completed and a vacuum begins to be formed in the chamber, the compressed air in the air-vessel forces out the water from the said pipe and its sprinkler among the steam remaining in the said chamber and expedites the completion of condensation and the formation of the vacuum.

What I claim as my invention, and desire to secure by Letters Patent, is—

1. The combination, substantially as herein described, with the steam-valve of either of the two chambers of a hollow flexible diaphragm, the interior of which communicates with the interior of the other chamber, so that the opening and closing of the steam-inlet valve of either chamber are effected through the agency of the vacuum and pressure produced in the other chamber, as herein set forth.

2. The hollow flexible diaphragms F F, composed of pipes, in combination with the chambers A A, the bridges R R, and the disks or feet H H on the lower ends of the valve-stems, substantially as and for the purpose herein set forth.

WM. BURDON.

Witnesses:
FRED HAYNES,
FERD TUSCH.